April 22, 1969  E. C. NEUFELD, JR  3,439,720
POTATO SEED CUTTER APPARATUS
Filed July 18, 1966  Sheet 3 of 4
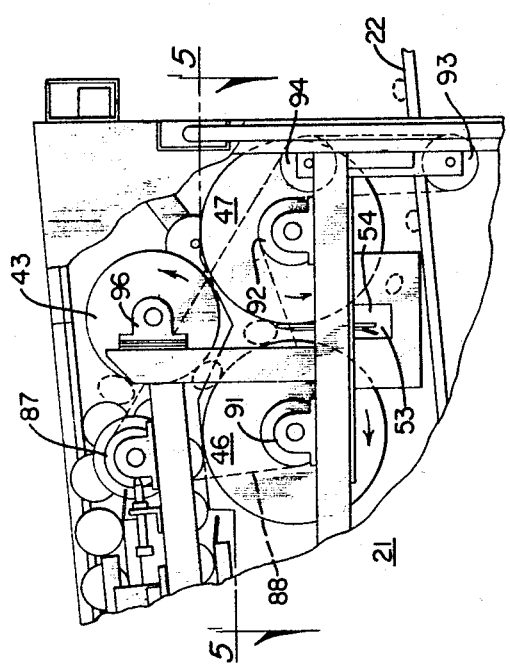
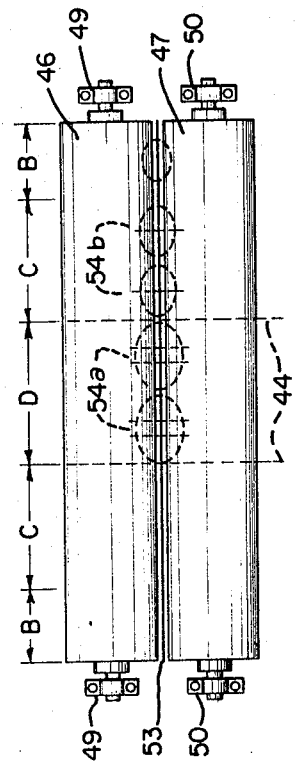
INVENTOR.
EDWIN C. NEUFELD JR.
BY
*McGrew & Edwards*
ATTORNEYS

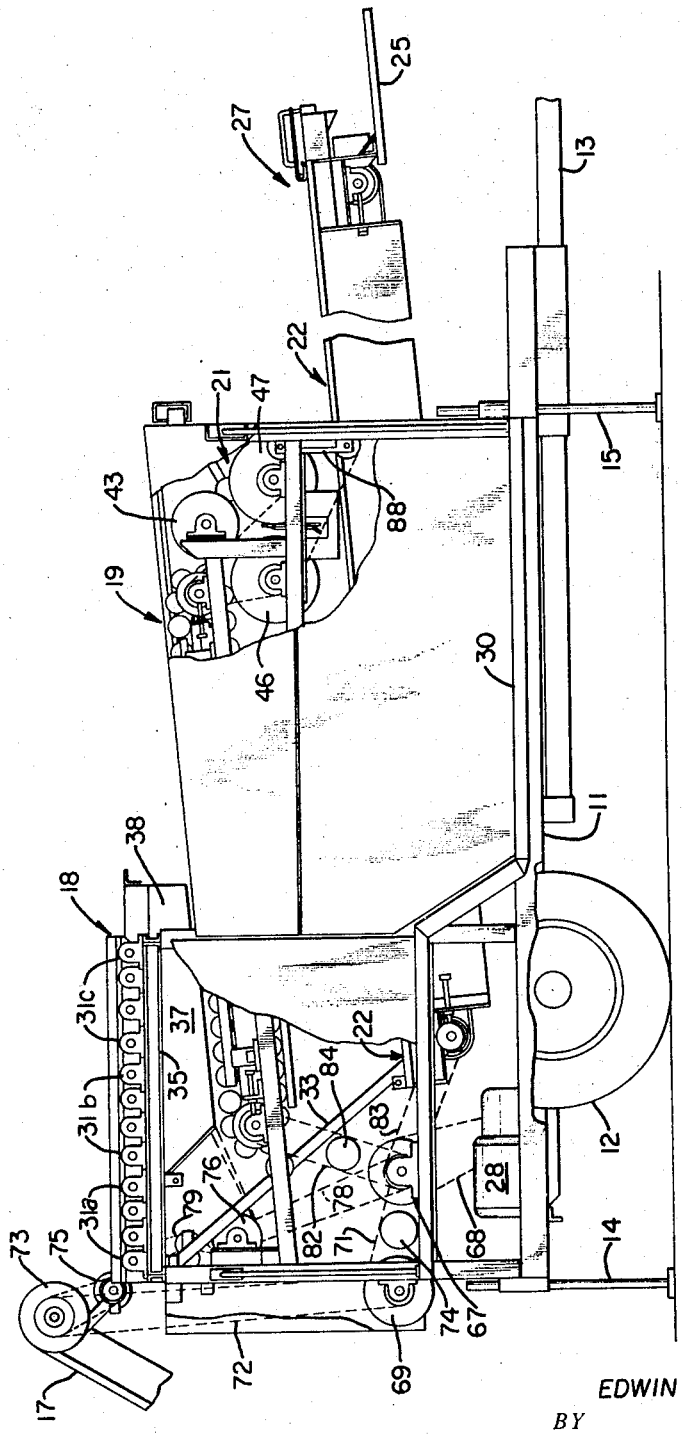

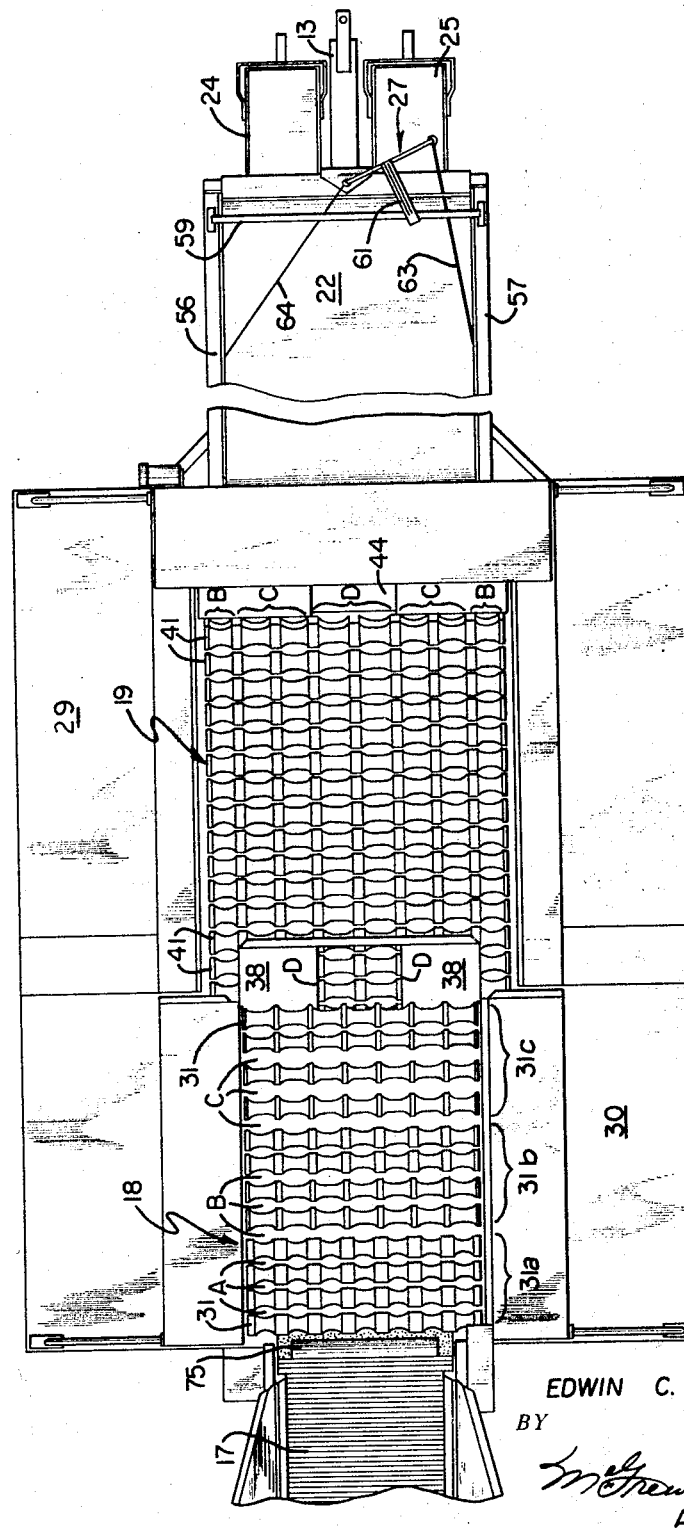

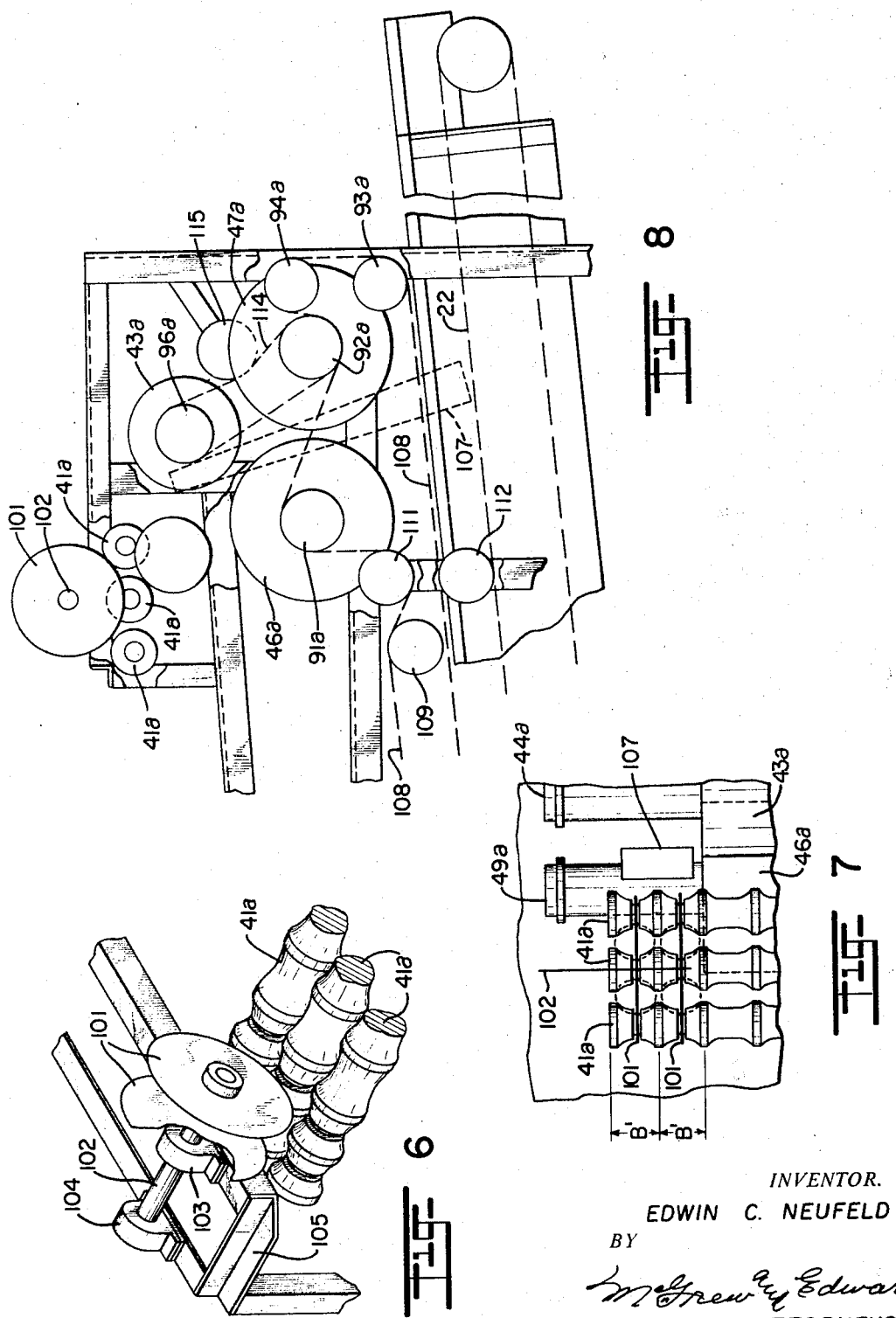

United States Patent Office 3,439,720
Patented Apr. 22, 1969

3,439,720
POTATO SEED CUTTER APPARATUS
Edwin C. Neufeld, Jr., Gering, Nebr., assignor, by mesne assignments, to Lockwood Corporation, Gering, Nebr., a corporation of Delaware
Filed July 18, 1966, Ser. No. 565,983
Int. Cl. A01c 9/00; A01f 29/00, 31/00
U.S. Cl. 146—57                                18 Claims

ABSTRACT OF THE DISCLOSURE

Seed cutter for potatoes having elevating conveyor, one endless conveyor stretch including plurality of adjustable rotary rollers having notched surfaces for sorting potatoes into streams of at least no-cut sizes and plural graded sizes larger than no-cut sizes and another endless conveyor stretch including rollers having notched surfaces and arranged in receiving relation to the plural graded sizes for maintaining graded potatoes of different sizes in plural separate streams with lengthwise axis of each potato transverse of direction of movement for delivery to cutter assembly. Cutter assembly including pair of yieldable rollers in common horizontal plane and cutter blade upright between rollers having transverse blade edges related to different sizes of separate graded streams to provide desired cuts. Take-away conveyor arranged for receiving no-cut sizes and cut sections and delivering same to sacking stations.

---

This invention relates to a seed cutter assembly of the type used in cutting whole potatoes into individual seed sections.

Various types of potatoes are grown commercially and these vary considerably in size and shape. Potatoes which meet certain standards are used as seed for planting the next year's crop and particularly in the case of larger sizes of potatoes the eyes will be so distributed that the potato can be cut into smaller slices, each of which will perform its required function as seed.

Growers and processors who produce seed from stored potatoes employ various types of cutter assemblies to reduce the larger potato size into seed sections and there is a considerable amount of equipment available on the market for this purpose. In general, such equipment is satisfactory for its intended purposes but much of the equipment lacks the adaptability to function efficiently with potatoes of substantially different sizes and shapes. For example, equipment which treats round potatoes in a variety of sizes efficiently may be inefficient in handling potatoes of the elongated type in which the length of the potato is several times its diameter. Difficulty is encountered in positioning the potatoes properly for movement into the cutter blades, often resulting in cut sections of excessive length and fewer sections per potato than should be obtained.

To offset the deficiencies of certain types of equipment, many workers per machine will be utilized to hand sort, distribute and position potatoes so that the cutting action is efficient.

The present invention incorporates certain innovations over prior practice which substantially reduce the manual work required in operation of the machine and which produce potato seed in required sizes in an efficient and economical manner. These innovations include a novel conveyor system which provides mechanical grading and sorting of potatoes being delivered to a cutting section combined with controlled positioning to maintain the potatoes in the desired position for contact with the cutting knives of the cutter assembly.

Another innovation of the present invention is the mechanical arrangement of the potatoes in size graded rows advancing to the cutter assembly with color indicia identifying the rows for assistance of manual sorting and distributing procedures.

A further innovation resides in the utilization of the conveyor system to first eliminate "no-cut" sizes, i.e., whole potatoes small enough to be used as a single seed source, from the feed to the cutting section and subsequently recombining the "no-cut" sizes with the cut sections before final discharge as packaged seed.

It is an object of my invention to provide a simple, durable and economical potato seed cutter assembly which is adapted to operate on a continuous basis with only a small amount of operator assistance and which sorts potatoes and cuts graded sizes to produce potato seed including sized whole potatoes and cut sections.

Another object of my invention is to provide a novel conveyor system in a potato seed cutter assembly which includes a sizing action, an arranging action for directing potato movement along selected courses, and a positioning of potatoes in their advance to the cutting action which insures maximum efficiency in the cutting action.

A further object of my invention is to provide a novel conveyor system in a potato seed cutter assembly which is adjustable to effectively size and arrange potatoes of different sizes and shapes in proper position for efficient cutting into seed sections.

Other objects reside in noval details of construction and novel combinations and arrangements of parts, all of which will be set forth in the course of the following description.

The practive of the invention will be best understood by reference to the accompanying drawings, in the several views of which like parts bear similar reference numerals and in which:

FIG. 1 is a side elevation view of a seed cutter embodying this invention partially broken to show interior parts;

FIG. 2 is a top plan view of the seed cutter shown in FIG. 1;

FIG. 3 is a front end elevation view of the seed cutter shown in FIG. 1 with a button portion of the base structure removed;

FIG. 4 is a fragmentary side elevation view of the cutter assembly shown in FIG. 1 drawn to an enlarged scale;

FIG. 5 is a sectional view taken along lines 5—5 of FIG. 4 showing the cutter rollers and cutter blade with the position of potatoes being cut indicated in broken lines;

FIG. 6 is a perspective view of an alternative arrangement for cutting the two-cut potato sizes;

FIG. 7 is a fragmentary schematic top plan view showing the relation of the rollers of the centering section to the cutting blades shown in FIG. 6; and FIG. 8 is a side elevation view showing the alternative cutting arrangement shown in FIGS. 6 and 7 and also an alternative drive arrangement for the upper and lower rollers of the cutter assembly.

Referring now to the drawings and particularly to FIGS. 1, 2 and 3, reference will be made to the general structure of the seed cutter assembly followed by a more specific description of particular features. In general, there is provided a base structure 11 supported on wheels 12 with a draw bar 13 at the forward end for transport of the apparatus to working locations. Jack legs 14 and 15 are provided at opposite ends of the base structure for supporting the structure in a substantially horizontal stationary position.

An elevating conveyor 17 is provided at the rearward end and has its discharge end above the base structure which feeds incoming potatoes onto a substantially horizontal conveyor assembly which conducts the potatoes to the cutter assembly, including a sizing section 18 which receives the feed from the elevating conveyor and sizes the potatoes for different cuts and directs the potatoes in size graded rows by gravity flow in a chute assembly to a centering section 19 disposed below the sizing section and extending forwardly thereof. In the centering section 19 the size graded rows of potatoes are maintained in such rows and alined for proper entry into the cutter assembly by positioning the lengthwise axis of each potato transversely of their direction of movement.

A cutter assembly 21 is disposed at the forward end of the base structure and in spaced proximity to the centering section for receiving the streams of size graded potatoes discharging from the plurality of rows of the centering section 19, which assembly slices or cuts the sized potatoes into various cuts of seed sections.

A take-away conveyor 22 is disposed beneath the cutter assembly 21 and the sizing section 18 for receiving the cut sections of potatoes from the cutter assembly and no-cut sections through chute member 33 and delivering them to a pair of sack holders or sacking stations 24 and 25 at the forward end of the take-away conveyor 22. A gate assembly 27 is provided on the take-away conveyor 22 at its discharge end for selectively directing the no-cut potatoes and cut potato sections to one or the other of said sacking stations 24 and 25. A pair of sacking stations have been illustrated as receiving the cut potato pieces. It will be understood that the output of the conveyor 22 may be delivered to various receiving means such as a bulk receiving system rather than the sacking stations shown in the drawings.

A drive motor 28 preferably of the electric gear motor type is supported on the base structure for driving the elevating conveyor 17, the sizing and centering conveyor sections 18 and 19, the cutter assembly 21 and the take-away conveyor 22 through suitable power transmission means including sheave members and belts, chains and the like as will be described more fully hereinafter. Platforms 29 and 30 are provided on each side of the base structure 11 to provide a support for workmen.

The sizing section 18 of the conveyor assembly which separates the incoming potatoes into streams of size graded rows of potatoes comprises a plurality of elongated rollers 31 disposed in spaced relationship lengthwise of the conveyor surface, which are mounted for rotation about axes which are substantially parallel. Each roller has a sprocket (not shown) which is coupled to drive motor 27 by suitable power transmission means so that each roller is individually driven. Each roller 31 has a plurality of alternate ridged and concave portions throughout their lengths which adjoin similar concave portions of an adjacent roller to form openings or gaps between adjacent portions of a size to pass potatoes in graded sizes.

Each roller 31 is individually mounted for slidable movement on a supporting surface 35 toward and away from an adjoining roller to provide an adjustment of the spacing between rollers for accommodating potatoes of different shapes. The rollers are arranged lengthwise of the conveyor surface in groups designated 31a, 31b and 31c proceeding from the rear forwardly with the rollers of each group having alternate ridged and concave portions of about the same size and a given roller having uniform concave portions throughout its length. The rollers of the respective groups have ridged and concave portions of different sizes so that adjoining concave portions and roller spacing form elongated discharge openings to pass the potatoes in graded sizes in the progressive movement along sizing section 18.

More specifically, the first four rollers or group 31a have the smallest concave portions and from three elongated discharge openings designated A transverse of the potato movement which grade or pass the smaller sizes of potatoes requiring no cutting and hereinafter referred to as the "no-cut." The no-cut potatoes after passing through these first three elongated openings A are carried by a chute member 33 to the take-away conveyor 22, thus bypassing the cutter assembly 21.

The next four rollers comprising group 31b have concave portions of intermediate dimension and with the last roller of group 31a form four elongated discharge openings designated B transverse to the potato movement which in the preferred arrangement pass the next smallest size of potatoes hereinafter referred to as the "two-cut." These two-cut sizes are conducted to the centering section by a suitable chute member 37 below the sizing section 18. The final four rollers comprising group 31c have concave portions of a larger dimension which with the last roller of group 31b form four elongated openings designated C transverse to the potato movement which in the preferred arrangement pass a larger potato size hereinafter referred to as the "four-cut" and a similar chute (not shown) directs the four-cut sizes onto the centering section.

A chute member 38 disposed at the discharge end of the sizing section 18 has inwardly inclining surfaces which terminate in a central discharge opening designated D. The potatoes which are too large to pass through discharge openings A, B and C are transported to the forward end of the sizing section by the rotating rollers 31. This largest potato size is hereinafter designated as the "six-cut" size. These six-cut sizes are discharged through discharge opening D onto the central portion of the centering section 19.

Referring now to the centering section 19 which generally maintains the potatoes in size graded rows and alines the incoming potatoes for proper entry into the cutter assembly, it comprises a plurality of rollers 41 disposed in spaced relationship in an endless conveyor configuration. Each of the rollers has a plurality of alternate ridged and concave portions disposed in spaced relationship along the lengthwise extent of the hollers so that adjoining concave portions of oppositely disposed rollers form seating surfaces for the potatoes for alining the lengthwise axis of the potatoes transversely of their direction of movement and maintaining the potatoes in size graded rows as they are conveyed along the length of the top stretch of centering section 19. Each of the rollers 41 is of substantially the same configuration and has ridged and concave portions on each roller of different lengths lengthwise of each roller which correspond with the elongated discharge openings of the sizing section as hereinabove described.

Proceeding from the center of rollers outwardly, there are two concave portions of the largest dimension disposed an equal distance from the center designated D which transport six-cut potato sizes to the cutter assembly. There are two concave portions of lesser dimension than the inner concave portions D on each side thereof designated C which transport four-cut potato sizes to the cutter assembly. At each of the outer ends of the rollers there is a single concave portion of the smallest dimension designated B which corresponds to the two-cut potato sizes of the sizing section. The different concave portions B, C and D of the centering section rollers are of different colors or color coded to provide an indicia to aid in the checking of the proper placement of the potatoes on centering section 19.

The cutter assembly 21 shown generally in FIG. 1 is illustrated in more detail particularly in FIGS. 4 and 5 and functions to slice or cut the sized potatoes into various cuts or sections. Cutter assembly 21 includes an upper roller 43 which interrupts the forward movement of the potatoes discharging from the centering section. This upper roller 43 has an intermediate recessed portion 44 (FIG. 1) indicated by broken lines in FIG. 5 which provides a larger gap for passing the larger or six-cut potatoes. The upper roller 43 preferably is of yieldable material such as sponge rubber or the like and intercepts and directs the incoming potatoes downwardly from the centering section 19 in a positive movement. In a alternative arrangement the upper yieldable roller will intercept the discharging potatoes and direct them downwardly in gravitational descent.

A pair of yieldable lower rollers 46 and 47 are disposed in a common horizontal plane beneath the upper roller and have adjacent surfaces in closely spaced relation along the axis of said common plane to provide a gap into which the descending potatoes are directed. These lower rollers 46 and 47 are adapted for rotation on suitable bearings 49 and 50, respectively, at each end. An elongated cutter blade 53 is disposed in the gap between the pair of rollers 46 and 47 and extends approximately the lengthwise extent of the pair of lower rollers. Sizing blades 54 (FIG. 4) are disposed on the elongated blade transversely thereof in selected spaced relationship to cut the incoming potatoes into two-cut, four-cut and six-cut sizes or sections. These sizing blades 54 preferably incline outwardly from a top apex and have knife-like upper edges to shear the potatoes as they are forced over the blade.

Sizing blades 54 are disposed on the elongated blade to correspond to the potato sizes hereinabove referred to as B, C and D on the sizing and centering sections. The D section of the blade which is approximately the length of recess 44 in the upper roller 43 has two pairs of sizing blades 54a disposed with respect to the two rows of incoming potatoes from the centering section so as to cut each potato into six-cut pieces. The C section of the blade has two sizing blades 54b in spaced relationship extending on each side of the elongated blade 53 so as to cut each incoming potato into four-cut pieces. The B section of the blade has no sizing blade so as to cut the incoming potato in half or in two-cut sizes along its length.

As shown in FIG. 3, the takeaway conveyor 22 preferably of the endless type has associated upright side walls 56 and 57 and has a portion intermediate its ends disposed beneath the pair of rollers 46 and 47 for receiving the cut sections from the cutter assembly 21 and has its downstream end disposed for receiving the no-cut potatoes discharged from the sizing section through the chute member 33. This conveyor 22 delivers the cut potato sections and the no-cut potatoes to plural sacking stations 24 and 25 or bulk at its downstream end.

Gate assembly 27 is provided at the discharge end of the takeaway conveyor for selectively directing the potatoes to one or the other of the sacking stations 24 and 25. This gate assembly 27 includes a cross rod 59 extending across the top of the upright side walls 56 and 57 at the discharge end of the conveyor 22 which supports a manually operable control bar 61 which is adapted for slidable movement across rod 59. Control bar 61 has two downwardly depending end members 61a and 61b (FIG. 3), each of which is pivotally attached to an elongated gate members 63 and 64, respectively, which extend rearwardly along the conveyor to a pivotal point adjoining side walls 56 and 57, respectively. In the position shown, the no-cut potatoes and potato sections are directed by gate members 63 and 64 into the sacking station 25. Movement of the control bar 61 across the cross rod 59 shifts the gate members 63 and 64 to direct the incoming potatoes into the other sacking station 24.

Another arrangement for cutting the two-cut size potatoes particularly suitable for long potatoes is to provide a notched portion in blade 53 in the area of the B section. A sizing blade is disposed in this notched portion transversely of blade 53 so the two-cut potatoes will be cut by this sizing blade instead of blade 53 and along the width of the potato instead of along its length as it is passed through rollers 46 and 47.

Referring now to the drive system, there is provided a single drive motor 28 preferably of the electric gearmotor type supported on the base structure 11. Power is transmitted from the motor to a central sheave member 67 by a transmission means 68, such as belts, chains or the like. Rotary movement of the central sheave member 67 is arranged to drive the elevating conveyor 17 through an intermediate sheave member 69 by transmission means 71 and 72. A variable speed drive 74 is provided in the transmission means 71 between sheave members 67 and 69 to vary the speed of the elevating conveyor 17. The rotary movement of the elevating conveyor 17 is transmitted by transmission means 73 coupled to the elevating conveyor to rotate a roller 75 disposed below the elevating conveyor 17.

Rotary movement of the sheave member 67 is transmitted to the sizing section rollers 31 through an intermediate sheave member 76 and transmission means 78 and 79. The centering section 19 and the takeaway conveyor are directly coupled to the intermediate sheave member 67 by transmission means 82 and 83, respectively. A variable speed drive 84 is provided in the transmission means 82 between sheave member 67 and the centering section 19 to vary the speed of the centering section 19. The rotary movement of the centering section 19 is transmitted to the cutter assembly 21 from a sheave 87 (FIG. 4) at the forward end of the centering section and a belt member 88. Belt member 88 extends from the conveyor sheave 87 downwardly and around a sheave 91 on roller 46, then upwardly over the top of a sheave 92 on roller 47, then downwardly around a lower sheave 93 upwardly and over the top of an upper sheave 94 and across the bottom of a sheave 96 on upper roller 43. Rotation of the conveyor sheave 87 in the clockwise direction will then drive roller 46 in a clockwise direction, roller 47 in a counterclockwise direction and upper roller 43 in a counterclockwise direction as indicated by arrows.

An alternative arrangement for cutting the two-cut potatoes from that previously described is shown in FIGS. 6 through 8. In this arrangement there is provided rollers 41a forming a part of the centering section and each having two concave portions B' at each end of the rollers for carrying two streams of two-cut sizes on each side of the centering section as distinguished from one previously designated B. Only one end of the rollers has been shown in FIGS. 6 and 7 and reference will be hereinafter made to this one end for purposes of description but it is understood that the opposite end of the roller 41a is identical and likewise carries two streams of two-cut sized potatoes.

Above each concave portion B' and centrally thereof there is supported a similar rotatable cutting blade 101. These blades are supported by a single shaft 102 which is carried by inner and outer spaced journals 103 and 104 for rotation about a common axis of rotation. Journals 103 and 104 are disposed on frame assembly 105 at the side of the centering section. A chute member 107 is disposed at the downstream end of rollers 41a for carrying the two-cut potato sections discharged from the centering section directly to the takeaway conveyor 22. The upper roller 43a and upstream lower roller 46a are substantially reduced in length from those previously described with respect to FIGS. 1 through 5 and permit passage of the chute member on each side of the roller 46a.

A companion or similar pair of rotatable cutting blades are disposed above the concave portions at the other ends of rollers 41a, which are not shown, and a chute member similar to 107 at its discharge end is provided to receive its discharged two-cut potatoes and pass them directly to the takeaway conveyor on the other side of the centering section.

With this arrangement the two-cut potato sizes which are indicated in FIGS. 6 through 8 by broken lines are cut across the width of the potato instead of along the length of the potato as was accomplished by the blade 54 previously described with respect to FIG. 5.

An alternative arrangement for driving the cutter assembly is shown in FIG. 8 wherein the lower rollers 46a and 47a are driven directly from sheave member 67. A belt member 108 from sheave 67 extends over sheave member 109 and under sheave member 111 supported by the frame and then over the top of the sheave member 91a on roller 46a and then downwardly under sheave 92a on roller 47a. The belt member 108 is then passed upwardly over and upper sheave member 94a and around a lower sheave member 93a to a sheave member 112 and then back to sheave 67. Another belt member 114 is provided between sheave 92a and sheave 96a on the upper roller 43a to drive the upper roller therefrom. An adjacent adjustable sheave member 115 is provided to engage belt member 114 to adjust the tension and to take up any slack therein.

The number of rows of discharge openings previously in the sizing section of the conveyor assembly and previously designated A, B and C may be varied to meet capacity requirements. For the alternate cutter assembly for the two-cut potato sizes as above described the sizing section preferably is provided with four rows of discharge openings for passing the no-cut sizes, five rows of openings for passing the two-cut sizes and four rows of openings for passing the four-cut sizes.

Other changes and modifications may be availed of within the spirit and scope of the invention as set forth in the hereunto appended claims.

I claim:

1. A seed cutter for potatoes and the like comprising a base structure having an elevating conveyor for potatoes at one end, an intermediate conveyor assembly disposed in a substantially horizontal plane for receiving the potato discharge of the elevating conveyor including an endless conveyor stretch for conducting potatoes in a sorting action to a point of discharge adjacent the opposite end of said structure, a cutter assembly comprising an upper roller disposed in spaced proximity to the end of the endless conveyor for interrupting forward movement of potatoes discharging therefrom, a pair of lower yieldable rollers disposed in a common horizontal plane beneath the upper roller and having adjacent surfaces in closely spaced relation along the axis of said common plane for receiving descending potatoes and conducting them through the gap between the rollers, and elongated cutter means disposed in the gap between the pair of rollers to cut the entering potatoes into seed sections, a takeaway conveyor beneath the pair of rollers for receiving the cut sections and delivering them to a point of discharge, means for rotating the upper roller so that its upper surface adjacent the endless conveyor rotates toward said conveyor, and means for rotating the pair of rollers so that their upper surfaces are moving oppositely, toward the gap, whereby the potato discharge from the endless conveyor is directed in a positive movement by the upper roller onto the pair of rollers and through the gap into progressive contact with the elongated cutter means.

2. A seed cutter as set forth in claim 1 wherein said conveyor assembly includes an adjustable sizing section adjacent said elevating conveyor for separating the potatoes and directing them into sized graded rows on the endless conveyor stretch.

3. A seed cutter as set forth in claim 1 wherein said endless conveyor stretch includes means for alining the potatoes along their lengthwise axes transversely of their direction of travel.

4. A seed cutter as set forth in claim 1 wherein said adjustable gate includes a pivotal arm angularly disposed above said takeaway conveyor.

5. A seed cutter as set forth in claim 1 wherein said potato sections are delivered to a plurality of sacking stations and an adjustable gate means being provided at the discharge end of the takeaway conveyor for selectively directing the cut sections on the conveyor to one or the other of said sacking stations.

6. In apparatus for producing seed sections from potatoes, an endless conveyor disposed in a substantially horizontal plane adapted for receiving plural streams of potatoes in size graded rows at one of its ends and conducting the sized potatoes to a cutter assembly at its other end, and means for driving said endless conveyor, said conveyor comprising a plurality of rollers in spaced arrangement along its conveying surface having alternate ridged and concave portions throughout their lengths, and the plurality of rollers being of substantially uniform configuration, said concave portions on each roller corresponding to the sizes of the potatoes in each row, and adjacent concave portions of the rollers being spaced to form seating surfaces for confining potatoes with their lengthwise axes disposed transversely of their direction of movement along the row and maintaining the potatoes in size graded rows during their progressive movement to the cutter assembly.

7. In apparatus as set forth in claim 6 wherein the concave portions of different dimension on each roller are of a distinctive color for identifying the size of the potatoes in each row.

8. In a seed cutter assembly for producing seed sections, said assembly adapted for a continuous feed and discharge of potatoes and comprising a pair of lower yieldable rollers disposed in a common horizontal plane beneath an upper roller and having adjacent surfaces in closely spaced relation along the axis of said common plane for receiving descending potatoes and conducting them through the gap between the rollers, elongated cutter means disposed in the gap between the pair of rollers to cut the entering potatoes into sections, means for rotating the upper roller so that its upper surface rotates oppositely of the direction of forward movement of incoming potatoes, and means for rotating said pair of rollers so that their upper surfaces are moving oppositely toward the gap, whereby potato feed is directed in a positive movement by the upper roller onto the pair of yieldable rollers and said yieldable rollers conduct potatoes through the gap into progressive contact with the elongated cutter means.

9. In a seed cutter assembly as set forth in claim 8 wherein said upper roller is of a yieldable material.

10. In a seed cutter assembly as set forth in claim 8 wherein said upper roller has an intermediate recessed portion for passing potatoes of larger sizes.

11. In a seed cutter assembly as set forth in claim 8 wherein said cutter means includes a substantially vertically disposed blade extending lengthwise of said pair of rollers.

12. In a seed cutter assembly as set forth in claim 11 wherein said vertical blade includes sizing blades disposed in spaced relationship transversely of said vertical blade.

13. A seed cutter for potatoes and the like comprising a base structure having an elevating conveyor for potatoes at one end, an intermediate conveyor assembly disposed in a substantially horizontal plane for receiving the potato discharge of the elevating conveyor including an endless conveyor stretch for conducting potatoes in a sorting action to a point of discharge adjacent the opposite end of said structure, a cutter assembly comprising an upper roller disposed in spaced proximity to the end of the endless conveyor for interrupting forward movement of potatoes discharging therefrom, a pair of lower yieldable rollers disposed in a common horizontal plane beneath the upper roller and having adjacent surfaces in closely spaced relation along the axis of said common plane for receiving descending potatoes and conducting them through the gap between the rollers, and elongated cutter means disposed in the gap between the pair of rollers to cut the entering potatoes into seed sections, a takeaway conveyor beneath the pair of rollers for receiving the cut sections and delivering them to a point of discharge, means for rotating the upper roller so that its upper surface adjacent the endless conveyor rotates toward said conveyor, and means for rotating the pair of rollers so that their upper surfaces are moving oppositely, toward the gap, whereby the potato discharge from the endless conveyor is directed in its gravitational descent by the upper roller onto the pair of rollers and through the gap into progressive contact with the elongated cutter means.

14. In apparatus for producing seed sections from potatoes, an upper conveyor member disposed in a substantially horizontal plane for receiving potatoes from a supply source at one of its ends, said conveyor comprising a plurality of individually driven rollers in spaced arrangement lengthwise of the conveyor surface and rotatable in the same direction about axes which are substantially parallel, said rollers having alternate ridged and concave portions throughout their length spaced to form discharge openings between adjacent concave portions, means for selectively shifting the axes of adjacent rollers so as to vary the spacing gap between adjacent rollers to a size to pass potatoes in graded sizes, at least one conveyor disposed below the upper conveyor to receive and advance potatoes penetrating the discharge openings of the upper conveyor, and means associated with the upper conveyor for directing potatoes onto the conveying surface of the lower conveyor in size graded rows, said lower conveyor having indicia means designating potato sizes in the respective rows.

15. In apparatus for producing seed sections from potatoes, an upper conveyor member disposed in a substantially horizontal plane for receiving potatoes from a supply source at one of its ends, said conveyor comprising a plurality of individually driven rollers in spaced arrangement lengthwise of the conveyor surface and rotatable in the same direction about axes which are substantially parallel, said rollers being arranged in at least three groups in the direction of travel of potatoes, the rollers of each group having ridged and concave portions of about the same dimension and the rollers of different groups being of differing dimension forming between adjacent rollers discharge openings of different dimension for the discharge of potatoes into no-cut sizes and at least two graded sizes larger than no-cut sizes, means for selectively shifting the axes of adjacent rollers so as to vary the spacing gap between adjacent rollers to a size to pass potatoes in graded sizes, at least one conveyor stretch disposed below the upper conveyor to receive and advance potatoes penetrating the discharge openings of the upper conveyor and including a plurality of rollers arranged in an endless configuration having surface portions for maintaining said graded sizes in alined separate streams, the lengthwise axis of each potato in said streams transverse of its direction of movement thereon, and means associated with the upper conveyor for maintaining said graded sizes in separate streams while directing said potatoes onto the conveying surface portion of the lower conveyor stretch in size graded streams.

16. A seed cutter for potatoes and the like comprising means for feeding potatoes of mixed sizes onto a first conveyor assembly, said assembly having means for discharging potatoes sequentially from a sorting surface in no-cut sizes and separate streams of at least two graded sizes larger than no-cut sizes, an endless conveyor stretch having at least a portion underlying said sorting surface and including portions for maintaining the potatoes of different graded sizes in alined separate streams, the lengthwise axis of each potato in said streams transverse of its direction of movement thereon while conducting potatoes deposited thereon to a point of discharge adjacent the opposite end of said stretch, a cutter assembly including a pair of yieldable rollers having adjacent surfaces in closed spaced relation, and an elongated cutter means having cutter portions related to the separate streams of graded sizes of said endless conveyor stretch disposed in the gap between the pair of rollers to cut entering potatoes from said endless conveyor into seed sections, a takeaway conveyor beneath the pair of rollers for receiving the cut sections, means for directing the discharge of sorted no-cut potatoes from the first conveyor assembly onto said takeaway conveyor, and means for directing the discharge of said two larger grade sizes in separate streams from the first conveyor assembly onto said endless conveyor for delivery to the cutter assembly, whereby the potato discharge from the takeover conveyor includes the non-cut sizes and all sizes of cut seed sections.

17. A seed cutter for potatoes and the like comprising a base structure having means for feeding potatoes of mixed sizes onto a first conveyor assembly, said assembly having means for discharging potatoes sequentially from a sorting surface in streams of no-cut sizes and at least two separate streams of graded sizes larger than no-cut sizes, an endless conveyor stretch having at least a portion underlying said sorting surface and including portions for maintaining the potatoes of different graded sizes in alined separate streams, the lengthwise axis of each potato in said streams transverse of its direction of movement while conducting potatoes deposited thereon to a point of discharge adjacent the opposite end of said stretch, blade means disposed at the discharge end of said endless conveyor for cutting one of said graded size as they are carried on said endless conveyor stretch, a pair of yieldable rollers having adjacent surfaces in closely spaced relationship, an elongated cutter means having cutter portions related to the separate streams of graded sizes of said endless conveyor stretch disposed in the gap between the pair of rollers to cut entering potatoes of another of said graded sizes discharged from said endless conveyor stretch, a takeaway conveyor beneath the pair of rollers for receiving the cut sections, means for directing the discharge of sorted no-cut potatoes from the first conveyor assembly onto said takeaway conveyor, means for directing the discharge of said two larger grade sizes from the first conveyor assembly onto said endless conveyor for delivery to the blade means and to the yieldable rollers, respectively, and means for directing the discharge of cut sections from the blade means directly to the takeaway conveyor, whereby the discharge from the takeaway conveyor includes the no-cut sizes and all sizes of cut seed sections.

18. A seed cutter as set forth in claim 17 wherein said blade means includes a pair of blade members rotatably supported above and at a side of the downstream end of the endless conveyor stretch, each said blade disposed to cut the potatoes carried by said conveyor stretch across the width of the potato.

References Cited
UNITED STATES PATENTS

| | | | |
|---|---|---|---|
| 1,173,737 | 2/1916 | Quesnell | 209—106 |
| 2,370,539 | 2/1945 | Hodecker | 209—106 |
| 2,588,309 | 3/1952 | Troyer | 209—106 |
| 3,096,801 | 7/1963 | Miles et al. | 146—59 X |
| 3,133,573 | 5/1964 | Cummings | 146—59 X |
| 3,195,597 | 7/1965 | Peterson | 146—59 X |

JAMES M. MEISTER, *Primary Examiner.*

U.S. Cl. X.R.

209—106; 146—59, 78, 98